United States Patent [19]
Emambakhsh

[11] Patent Number: 5,487,560
[45] Date of Patent: Jan. 30, 1996

[54] APPARATUS FOR CONTROLLING FLOW OF INFLATION FLUID INTO AN AIR BAG

[75] Inventor: Al S. Emambakhsh, Flat Rock, Mich.

[73] Assignee: TRW Vehicle Safety Systems Inc., Lyndhurst, Ohio

[21] Appl. No.: 293,675

[22] Filed: Aug. 19, 1994

[51] Int. Cl.⁶ .................................................. B60R 21/26
[52] U.S. Cl. ........................................ 280/740; 280/743.2
[58] Field of Search ................. 280/728 R, 729, 280/730 R, 732, 736, 740, 743 R

[56] References Cited

U.S. PATENT DOCUMENTS

| | | | |
|---|---|---|---|
| 3,614,127 | 10/1971 | Glance | 280/729 |
| 3,784,223 | 1/1974 | Hass et al. | 280/740 |
| 4,262,931 | 4/1981 | Strasser et al. | 280/743 R |
| 4,265,468 | 5/1981 | Suszko et al. | |
| 4,830,401 | 5/1989 | Honda | |
| 5,018,762 | 5/1991 | Suzuki et al. | 280/743 R |
| 5,033,772 | 7/1991 | Franton | 280/737 |
| 5,094,476 | 3/1992 | Chihaya | 280/732 |
| 5,160,164 | 11/1992 | Fischer et al. | |
| 5,172,933 | 12/1992 | Strasser | |
| 5,215,795 | 6/1993 | Matsumoto | 280/743 R |
| 5,226,671 | 7/1993 | Hill | |
| 5,236,740 | 11/1993 | Frey | 280/737 |
| 5,326,131 | 7/1994 | Yokota et al. | 280/743 R |
| 5,340,147 | 8/1994 | Funtecchio | 280/729 |

FOREIGN PATENT DOCUMENTS 5-193435 8/1993 Japan ..................... 280/736

*Primary Examiner*—Karin L. Tyson
*Attorney, Agent, or Firm*—Tarolli, Sundheim & Covell

[57] ABSTRACT

A vehicle occupant restraint system comprises an inflatable air bag (12), an air bag canister (24) having walls defining an interior chamber (25) in which the air bag is stored, and a source of inflation fluid (20) for inflating the air bag. The source of inflation fluid includes (i) an inflator body (21) having opposite ends and (ii) a nozzle opening (23) disposed at one end of the inflator body. A deflector panel (50) is attached to the air bag. The deflector panel defines an opening (45) through which inflation fluid flows to inflate the air bag. The deflector panel has surfaces (71, 72) that deflect inflation fluid flow from the nozzle opening (23) and through the opening (45).

12 Claims, 3 Drawing Sheets

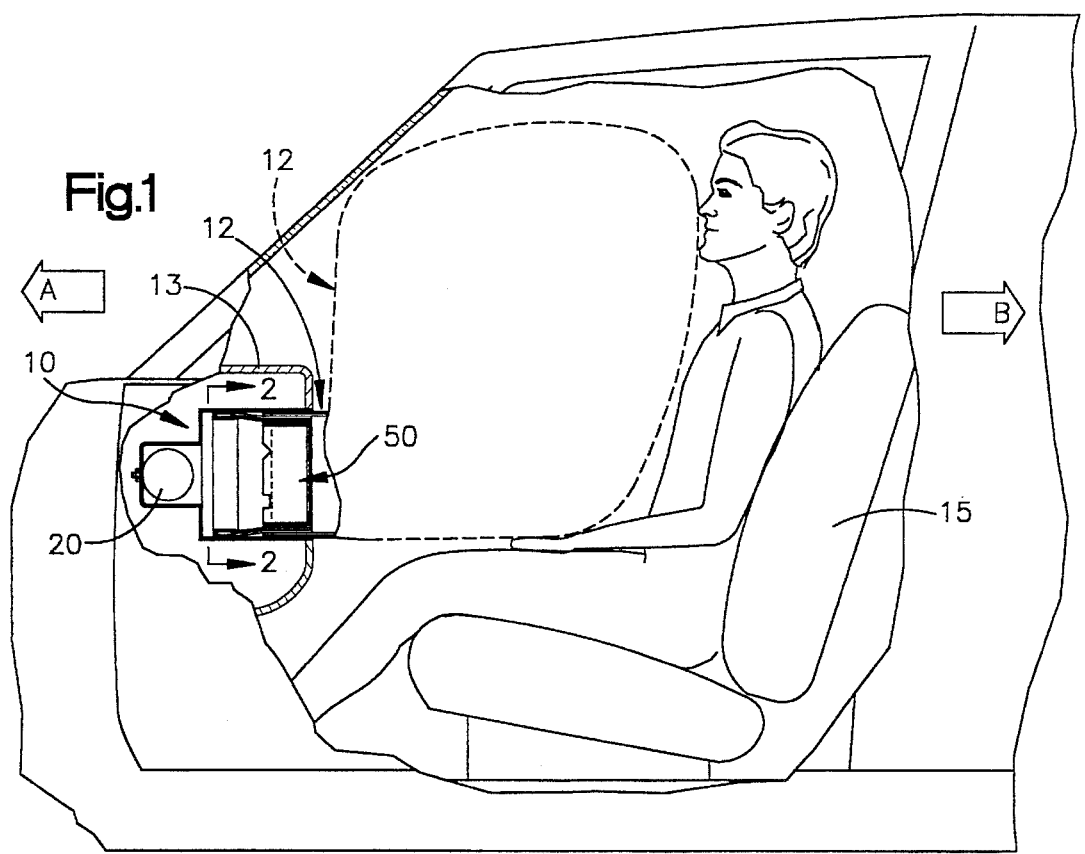
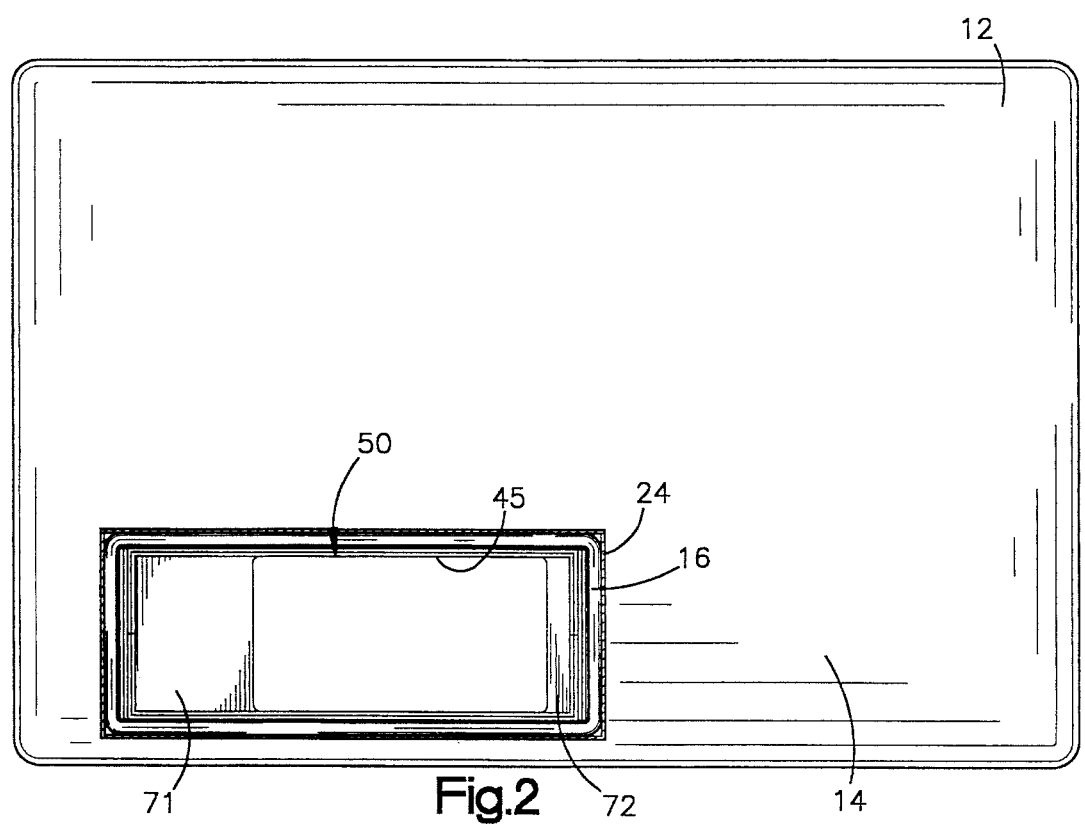

APPARATUS FOR CONTROLLING FLOW OF INFLATION FLUID INTO AN AIR BAG

BACKGROUND OF THE INVENTION

1. Technical Field

The present invention relates to a vehicle occupant restraint system, and is particularly directed to an apparatus for controlling flow of inflation fluid from a fluid source into an inflatable vehicle occupant restraint.

2. Background Art

A vehicle occupant restraint system having an inflatable air bag is known. Typically, an inflation fluid source includes a pyrotechnic gas generant, a stored gas supply, or a combination of the two, and releases inflation fluid in response to a signal indicative of vehicle deceleration of at least a predetermined magnitude. The inflation fluid from the inflation fluid source is directed into the air bag to inflate the air bag.

One type of inflation fluid source has a number of nozzle openings located at one end of the fluid source. Even though the nozzle openings are located at one end of the fluid source, it is desirable to direct the flow of inflation fluid into the air bag relatively uniformly.

SUMMARY OF THE INVENTION

In accordance with the present invention, a vehicle occupant restraint system comprises an inflatable air bag, an air bag canister having walls defining an interior chamber in which the air bag is stored, and a source of inflation fluid for inflating the air bag. The source of inflation fluid includes an inflator body having opposite ends. The source of inflation fluid has a nozzle opening disposed at one end of the inflator body. Deflector panel means is attached to the air bag and defines an opening through which inflation fluid flows into the air bag to inflate the air bag. The deflector panel means is in the path of a portion of the inflation fluid flow from the inflation fluid source and deflects the portion of inflation fluid flow through the opening defined by the deflector panel means. Preferably, the deflector panel means is sewn to the air bag.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view of a vehicle occupant restraint system embodying a deflector panel in accordance with the present invention;

FIG. 2 is a sectional view taken approximately along line 2—2 of FIG. 1;

DESCRIPTION OF PREFERRED EMBODIMENT

The present invention is directed to a vehicle occupant restraint system having an inflatable vehicle occupant restraint, such as an inflatable air bag. The specific construction of the vehicle occupant restraint system may vary. By way of example, a vehicle occupant restraint system 10 embodying the present invention is illustrated in FIG. 1. The vehicle occupant restraint system 10 is in a vehicle having a passenger seat 15. The vehicle has a forward direction of travel indicated by arrow A and a rearward direction of travel indicated by arrow B. The passenger seat 15 has an inboard side (seen in FIG. 1) and an outboard side located adjacent the vehicle door.

Figure 3:
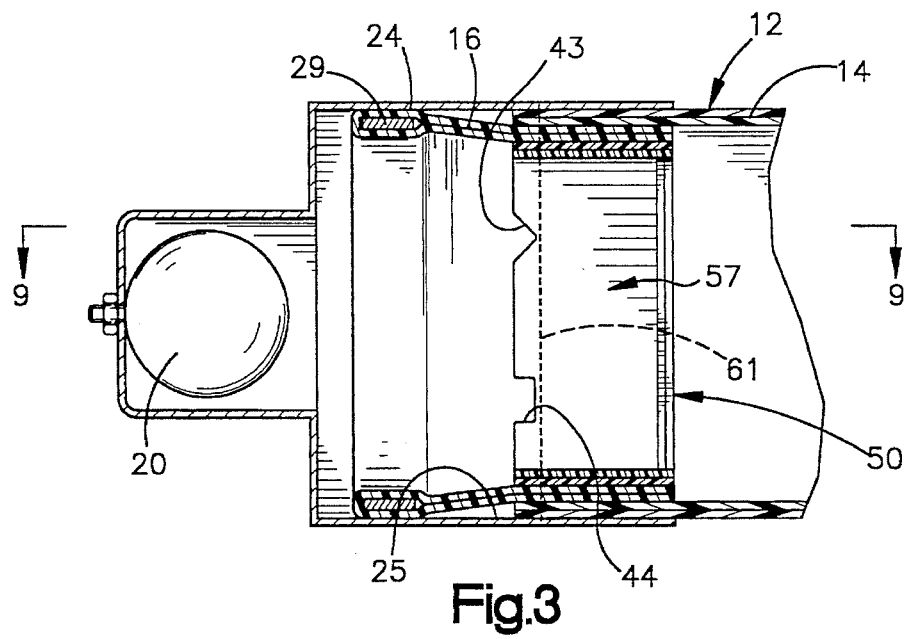
FIG. 3 is an enlarged view of a portion of FIG. 1.

Referring to FIGS. 1–3, the vehicle occupant restraint system 10 includes an inflatable air bag 12 for protecting an occupant seated in the passenger seat 15. When the vehicle is involved in a collision, the air bag 12 is inflated from a folded, collapsed condition to an expanded condition by a rapid flow of inflation fluid from an inflation fluid source, such as an inflator 20. When the air bag 12 is in the expanded condition (illustrated in dashed lines in FIG. 1), it restrains movement of an occupant seated in the passenger seat 15 and prevents the occupant from violently striking parts of the vehicle interior during a collision. The air bag 12 then quickly collapses so that the occupant is free to exit from the vehicle.

As best shown in FIG. 3, the air bag 12 includes a main body portion 14 and a neck portion 16 which is sewn to the main body portion 14 in a known manner. The neck portion 16 is not centered on the main body portion 14 as can be seen in FIG. 2. The neck portion 16 is offset toward the outboard side of the passenger seat 15 (toward the vehicle door) from the center of the air bag 12. The neck portion 16 is wrapped around a ring 29 and is secured to a rigid metal reaction canister 24 in a known manner, such as by fasteners (not shown) which extend through openings in the reaction canister 24, the material of the air bag 12, and the ring 29. The reaction canister 24 has walls which define an interior chamber 25 in which the folded air bag 12 is stored. The reaction canister 24 is located in the instrument panel 13 (FIG. 1) of the vehicle. Although the reaction canister 24 is shown as a separate structure located in the instrument panel 13, the reaction canister could alternatively be defined by surfaces of the instrument panel itself.

Figure 9:
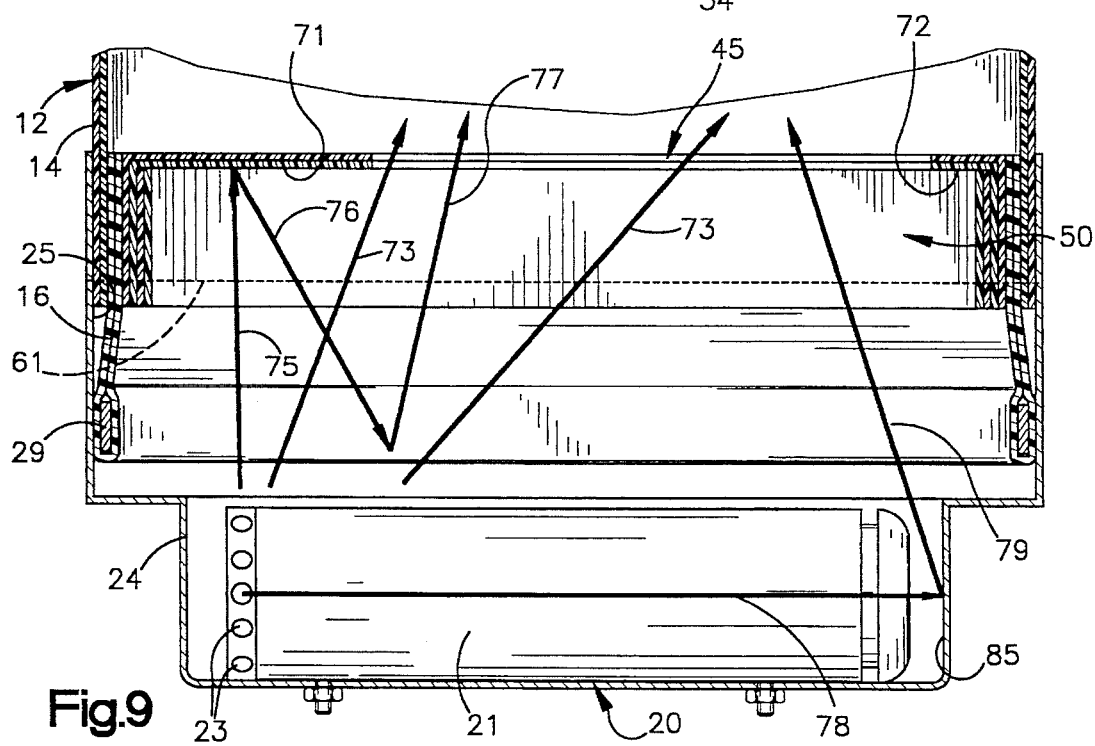
FIG. 9 is a sectional view taken approximately along line 9—9 of FIG. 3 and illustrating schematically the flow of inflation fluid into an inflatable vehicle occupant restraint.

Referring to FIG. 9, the inflator 20 illustrated is of the augment type. The inflator 20 includes a pressurized gas stored in a storage chamber, and an ignitable material which, when ignited, heats the stored gas. The pressure of the gas thus increases as the gas is heated. The pressurized gas in the storage chamber of the inflator 20 is then released to inflate the air bag 12.

The augment inflator 20 shown in FIG. 9 has a body portion 21 in which the gas is stored and a plurality of nozzle openings 23 disposed at one end of the body portion 21. The augment inflator 20 is oriented within the reaction canister 24 such that the nozzle openings 23 are located closer to the outboard side of the passenger seat 15 than the inboard side of the passenger seat 15. Flow of inflation fluid from the augment inflator 20 causes the air bag 12 to inflate into the passenger compartment of the vehicle. The augment inflator 20 is actuated in response to a signal from a vehicle deceleration sensor (not shown) indicative of the occurrence of a vehicle collision.

In accordance with the present invention, the vehicle occupant restraint system 10 comprises a deflector panel 50, as shown in FIGS. 1–3 and 9. The deflector panel 50 is attached to the neck portion 16 of the air bag 12 in the vicinity of the location at which the neck portion 16 is sewn to the main body portion 14 of the air bag 12. Preferably, the deflector panel 50 is sewn to both the neck portion 16 and the main body portion 14 of the air bag 12.

Figure 4:
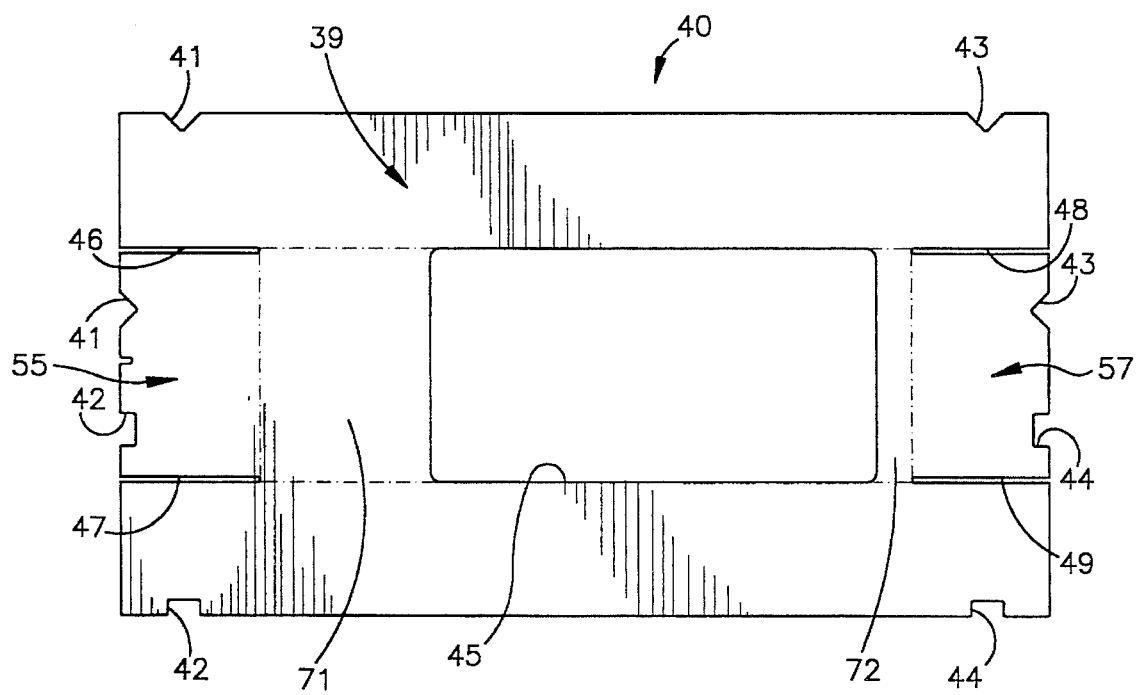
FIG. 4 is a plan view of a preformed piece of material before it is folded to form the deflector panel of FIG. 1.
Figure 5:
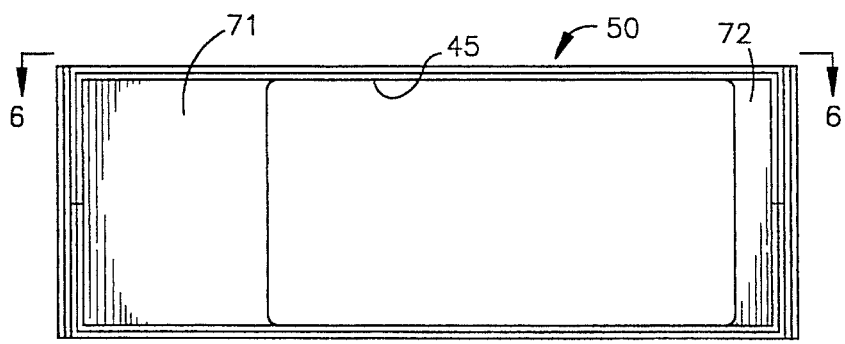
FIG. 5 is an enlarged view of the deflector panel of FIG. 2 which is formed from the preformed piece of material of FIG. 4.
Figure 6:
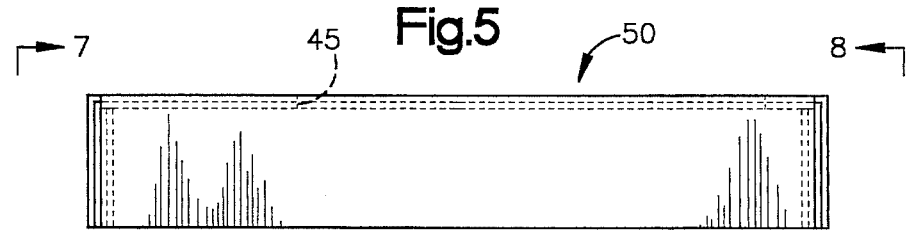
FIG. 6 is a view looking in the direction of line 6—6 of FIG. 5.

Referring to FIGS. 4–8, the specific construction of the defector panel 50 in accordance with the present invention is illustrated. The deflector panel 50 is formed from two fabric panels 40 as shown in FIG. 4. Preferably, each of the panels 40 is made of 420 denier nylon 6/6.

As shown in FIG. 4, each panel 40 is flat and has a major side surface 39. Each panel 40 is punched with a number of holes, notches, and slits. As shown in FIG. 4, the panel 40 is provided with a first pair of triangular notches 41, a second pair of rectangular notches 42, a third pair of triangular notches 43, a fourth pair of rectangular notches 44, a central opening 45, a first slit 46, a second slit 47, a third slit 48, and a fourth slit 49. The first and second slits 46 and 47 and the first and second pairs of notches 41 and 42 are located adjacent one end of the panel 40. The third and fourth slits 48 and 49 and the third and fourth pairs of notches 43 and 44 are located adjacent the opposite end of the panel 40. Between them, the first and second slits 46 and 47 define a first end flap 55. Likewise, the third and fourth slits 48 and 49 define between them a second end flap 57.

To form the deflector panel 50 shown in FIGS. 5–8, two panels 40 of FIG. 4 are located adjacent to each other so that one panel overlies the other panel. The two panels 40 are then folded and secured together to form the deflector panel 50.

Figures 7, 8:
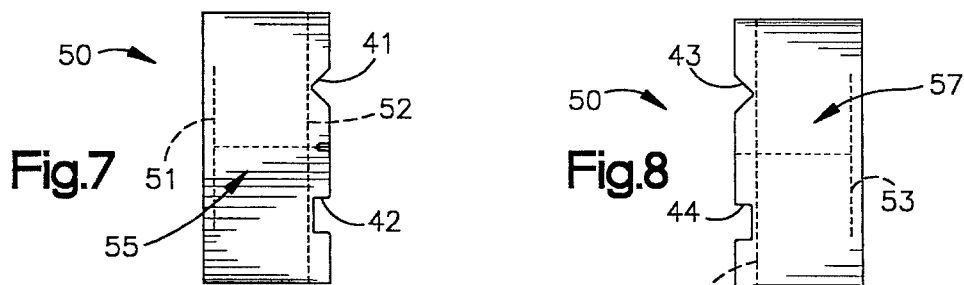
FIG. 7 is a view looking in the direction of line 7—7 of FIG. 6.
FIG. 8 is a view looking in the direction of line 8—8 of FIG. 6.

As can be seen in FIGS. 3 and 9, the assembled deflector panel 50 resembles a box with an open top. To achieve the box-like shape, the two panels 40 are manipulated and folded in the vicinity of the first slit 46 so that the first pair of triangular notches 41 align with and overlie each other. Also, the two panels 40 are manipulated and folded in the vicinity of the second slit 47 so that the second pair of rectangular notches 42 align with and overlie each other. As best shown in FIG. 7, after the first pair of notches 41 are aligned with and overlie each other and the second pair of notches 42 are aligned with and overlie each other, a first line of single needle stitches 51 and a second line of single needle stitches 52 are sewn along the end flap 55. The stitch lines 51 and 52 secure the end flap 55 to the overlying layers of material from the portions of the panels 40 which are separated from the end flap 55 by the first and second slits 46 and 47.

Similarly, the two panels 40 are manipulated and folded in the vicinity of the third slit 48 so that the third pair of triangular notches 43 align with and overlie each other. Also, the two panels 40 are manipulated and folded in the vicinity of the fourth slit 49 so that the fourth pair of rectangular notches 44 align with and overlie each other. As best shown in FIG. 8, after the third pair of notches 43 are aligned with and overlie each other and the fourth pair of notches 44 are aligned with and overlie each other, a third line of single needle stitches 53 and a fourth line of single needle stitches 54 are sewn along the end flap 57. The stitch lines 53 and 54 secure the end flap 57 to the overlying layers of material from the portions of the panels 40 which are separated from the end flap 57 by the third and fourth slits 48 and 49.

When the first, second, third, and fourth stitch lines 51, 52, 53, 54 have been sewn, a structure in the shape of a rectangular box has been formed to provide the deflector panel 50. The opening 45 is in the bottom of the box-like structure. The deflector panel 50 has a first deflecting surface 71 located at one end of the opening 45 and a second deflecting surface 72 located at an opposite end of the opening 45. The opening 45 and the first and second deflecting surfaces 71, 72 lie in substantially the same plane.

The first and second deflecting surfaces 71, 72 are portions of the major side surface 39 and face toward the nozzle openings 23 in the inflator 20. The first deflecting surface 71 has an area which is greater than the area of the second deflecting surface 72. Preferably, the first and second deflecting surfaces 71, 72 are coated with silicon to resist abrasion and to withstand high heat.

The deflector panel 50 is then sewn to the main body portion 14 of the air bag 12 and the neck portion 16 of the air bag 12, as best shown in FIGS. 3 and 9. Specifically, the deflector panel 50 is sewn to the neck portion 16 of the air bag 12 using a line of single needle stitches 61 around the entire perimeter of the opening in the neck portion 16 and the main body portion 14 of the air bag 12. Alternatively, the deflector panel 50 may be sewn to the neck portion 16 and the main body portion 14 of the air bag 12 using a line of double needle stitches (not shown) around the entire perimeter of the opening in the neck portion 16 and the main body portion 14 of the air bag 12.

As shown in FIGS. 1 and 2, the deflector panel 50 is offset from the center of the air bag 12 and is located more toward the outboard side of the passenger seat 15. The first deflecting surface 71 is located toward the outboard side of the passenger seat 15 and the second deflecting surface 72 is located toward the inboard side of the passenger seat 15. The outboard side of the passenger seat 15 is at the left side of FIG. 2 and the inboard side of the passenger seat 15 is at the right side of FIG. 2.

When the augment inflator 20 is actuated in response to occurrence of a vehicle collision, a portion of the inflation fluid flows from the nozzle openings 23 directly through the opening 45 and into the main body portion 14 of the air bag 12, as depicted by arrows 73 in FIG. 9. Also, a portion of the inflation fluid flows from the nozzle openings 23 toward the first deflecting surface 71 of the deflector panel 50, as depicted by arrow 75 in FIG. 9. This portion of the inflation fluid flow is reflected off of the first deflecting surface 71. The reflected inflation fluid flow off the first deflecting surface 71 is depicted by arrow 76 in FIG. 9.

The reflected inflation fluid flow depicted by arrow 76 is then redirected toward the opening 45 in the deflector panel 50 into the interior of the air bag 12 to inflate the air bag 12. This redirected inflation fluid flow is depicted by arrow 77 in FIG. 9. The reflected inflation fluid flow (depicted by arrow 76) is redirected as inflation fluid flow to the opening 45 in the deflector panel 50 (depicted by arrow 77) by the body 21 of the augment inflator 20 and also by the fluid pressure gradient developed as a result of the augment inflator 20 being actuated.

At the same time, a portion of the inflation fluid flows from the nozzle openings 23 at the one end of the inflator body 21 toward the opposite end of the inflator body 21, as depicted by arrow 78 in FIG. 9. This portion of the inflation fluid flow is reflected off a surface 85 on the reaction canister 24. The reflected inflation fluid flow off of the surface 85 is depicted by arrow 79 in FIG. 9. The reflected inflation fluid flow depicted by arrow 79 is redirected toward the opening 45 in the deflector panel 50 into the interior of the air bag 12 to inflate the air bag 12. Some of the inflation fluid flow depicted by arrow 79 in FIG. 9 may be reflected off the second deflecting surface 72 of the deflector panel 50 and then redirected toward the opening 45 in the same way as explained above with regard to the first deflecting surface 71 of the deflector panel 50.

An advantage of using a deflector panel 50 constructed in accordance with the present invention is that the inflation fluid flow into the interior of the air bag 12 is better distributed than if the deflector panel 50 did not exist. The inflation fluid flow into the interior of the air bag 12 is better distributed because the deflector panel 50 is offset more toward the outboard side of the passenger seat 15 with the relatively larger first deflecting surface 71 being located more toward the outboard side of the passenger seat 15. Since the first deflecting surface 71 is relatively larger than the second deflecting surface 72 and is located more toward the outboard side of the passenger seat 15, the inflation fluid flow from the augment inflator 20 is directed toward the center of the interior of the air bag 12. When the inflation fluid flow into the interior of the air bag 12 is more central, the trajectory of the air bag 12 while inflating is more central.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. A vehicle occupant restraint system comprising:
   an inflatable air bag;
   a source of inflation fluid for inflating said air bag, said source of inflation fluid including (i) an inflator body having opposite ends and (ii) a nozzle opening disposed at one end of said inflator body;
   deflector panel means attached to said air bag for (i) defining a single deflector opening through which inflation fluid is directed to flow into a predetermined region of said air bag to inflate said air bag along a predetermined trajectory and (ii) deflecting a portion of the inflation fluid flow from said nozzle opening disposed at said one end of said inflator body to flow through said deflector opening;
   said deflector panel means comprising a first deflecting surface located on one side of said deflector opening and a second deflecting surface located on an opposite side of said deflector opening, said second deflecting surface having an area which is less than the area of said first deflecting surface.

2. A vehicle occupant restraint system according to claim 1 wherein said first deflecting surface is located adjacent an outboard side of a passenger seat, and said second deflecting surface is located adjacent an inboard side of the passenger seat.

3. A vehicle occupant restraint system according to claim 1 wherein said deflector panel means comprises an open top box-like structure having four side walls and a bottom wall, said deflector opening being located in the bottom wall of said box-like structure.

4. A vehicle occupant restraint system according to claim 3 wherein said opening and said first and second deflecting surfaces lie in substantially the same plane.

5. A vehicle occupant restraint system comprising:
   an inflatable air bag;
   a source of inflation fluid for inflating said air bag, said source of inflation fluid including an inflator body having a nozzle opening;
   deflector panel means attached to said air bag for (i) defining a single deflector opening through which inflation fluid is directed to flow into a predetermined region of said air bag to inflate said air bag along a predetermined trajectory and (ii) deflecting a portion of the inflation fluid flow from said nozzle opening to flow through said deflector opening, said deflector panel means comprising a first deflecting surface located on one side of said opening and a second deflecting surface located on an opposite side of said opening, said second deflecting surface having an area which is less than the area of said first deflecting surface, said first deflecting surface being located adjacent an outboard side of a passenger seat, said second deflecting surface being located adjacent an inboard side of the passenger seat.

6. A vehicle occupant restraint system according to claim 1 wherein said source of inflation fluid comprises an augment inflator having nozzle openings only at said one end of said inflator body.

7. A vehicle occupant restraint system according to claim 1 wherein said deflector panel means comprises at least one fabric panel which is folded to form said deflector panel means.

8. A vehicle occupant restraint system according to claim 7 wherein at least one major side surface of said panel is coated with silicon, said silicon coated major side surface of said layer of fabric facing toward said source of inflation fluid to deflect inflation fluid flow from said source of inflation fluid.

9. A vehicle occupant restraint system according to claim 7 wherein said panel is made of 420 denier nylon 6/6.

10. A vehicle occupant restraint system according to claim 1 further comprising means for attaching said deflector panel means to said air bag.

11. A vehicle occupant restraint system according to claim 10 wherein said air bag includes a main body portion and a neck portion attached to said main body portion, said deflector panel means being attached to said neck portion of said air bag in the vicinity of the location at which said neck portion is attached to said main body portion.

12. A vehicle occupant restraint system comprising:
    an inflatable air bag;
    a source of inflation fluid for inflating said air bag, said source of inflation fluid including (i) an inflator body having opposite ends and (ii) nozzle openings in said inflator body;
    deflector panel means attached to said air bag for (i) defining a single deflector opening through which all of the inflation fluid from said source of inflation fluid is directed to flow into a predetermined region of said air bag to inflate said air bag along a predetermined trajectory and (ii) deflecting a portion of the inflation fluid flow from said nozzle openings in said inflator body to flow through said deflector opening.

* * * * *